United States Patent [19]

Harrington et al.

[11] 4,151,404
[45] Apr. 24, 1979

[54] RANDOM DIGIT GENERATOR

[75] Inventors: Timothy M. Harrington; Steven M. Harrington, both of Sierra Madre, Calif.

[73] Assignee: MDH Industries, Inc., Monrovia, Calif.

[21] Appl. No.: 847,395

[22] Filed: Oct. 31, 1977

[51] Int. Cl.² ............................................. H03K 21/32
[52] U.S. Cl. ........................ 235/92 GA; 235/92 DE; 235/92 CC; 235/92 R; 273/138 A
[58] Field of Search ........ 235/92 GA, 92 DE, 92 PE, 235/92 EA, 92 CC; 273/138 A

[56] References Cited

U.S. PATENT DOCUMENTS

| | | | |
|---|---|---|---|
| 3,064,889 | 11/1962 | Hupp | 235/92 CV |
| 3,584,398 | 6/1971 | Meyer et al. | 273/138 A |
| 3,709,499 | 1/1973 | Lukens | 273/138 A |
| 3,918,716 | 11/1975 | Nonaka et al. | 273/138 A |
| 3,929,338 | 12/1975 | Busch | 273/138 A |
| 3,962,565 | 6/1976 | Guyen-Phuoc | 235/92 EA |

*Primary Examiner*—Joseph M. Thesz
*Attorney, Agent, or Firm*—Arthur V. Doble

[57] ABSTRACT

An apparatus having a digital circuit containing a variable-modulus counter and a frequency source for rapidly cycling the variable-modulus counter through all of its states is used to produce a random sample from the set of digits through which the variable-modulus counter is cycling upon the actuation of a pushbutton-controlled sampling circuit. The sample is added to previous samples, if any, and displayed or may be cleared. A modulus selector is used to determine the modulus, or operating range, of the variable-modulus counter and may utilize any suitable commercial type device such as a rotary switch and logic gates. A synchronizer operates in response to the sample pushbutton to enable sampling counting at an appropriate instant of time.

10 Claims, 3 Drawing Figures

RANDOM DIGIT GENERATOR

BACKGROUND OF THE INVENTION

1. Field of the Invention

This invention generally relates to recreational and amusement apparatus and in particular to apparatus for the generation of random digits by means of a digital electronic circuit.

2. Prior Art

Various processes in the fields of statistics and entertainment require a means for generating a series of randomly selected digits from a limited set of digits. The most common method for producing these digits is the familar 6-sided die. Also in common use are dice with four, eight, ten and other numbers of sides. Ten-sided dice, for example are used to generate random number tables for use in statistical studies.

Other means for generating random digits include mechanically driven number wheels with stops or indicators used to identify the number. These mechanical means for digital generation all require a degree of mechanical balance or symmetry in order to assure that the digits generated are evenly distributed among the possible value.

Electronic means for generating random or nearly-random numbers include computations of some sort, such as computing the value of an irrational number such as a square root or logarithm and selecting digits from the middle of the resulting decimal fraction. These means are generally too complex for home entertainment or other occasional use.

Thus a simple, portable means of producing random digits would be of use in statistical work and in the amusement and entertainment industries.

SUMMARY OF THE INVENTION

Applicants herein have conceived of a new and useful apparatus having a digital circuit for generating random digits. The circuit includes a variable modulus counter that produces in sequence a selected set of numerical values, coupled to a sampling circuit that reads one of the values when a pushbutton is activated.

An internal frequency source cycles the counter rapidly through all its states so that the actuation of the pushbutton by the operator provides a random sample of the set of digits. The sampled value is then displayed for use. The variable-modulus counter is controlled by an operator-controlled selector switch to generate only that sequence of digits required by the operator for his particular purpose such as statistical work or some form of entertainment. An additional feature of this invention allows the accumulation of multiple digits together in order to produce non-uniform distributions of digits, centered about the mean value of the digits produced by the variable-modulus counter.

The present invention has several features of novelty over prior art including the use of digital electronic circuits to generate random digits, the provision for selection of one of several sets of digits corresponding to "n"-sided dice, and provision for summing sampled digits to produce a non-uniform distribution.

Accordingly, it is an object of this invention to provide a digital electronic apparatus for use in statistical work or for entertainment and amusement purposes which will display a random digit upon actuation of a pushbutton.

It is another object of this invention to provide an apparatus of the above type which will allow selection of one of several sets of digits that can be randomly sampled, where the set may be easily selected by an operator.

It is another object of this invention to provide for accumulating sums of samples in order to provide non-uniform distributions of numbers.

It is still another object of this invention to provide a digital electronic apparatus containing a variable-modulus counter, a frequency source for cycling the variable-modulus counter, a modulus selector for selecting an operating range of the variable-modulus counter, a synchronizer to enable counting at an appropriate instant of time and a counter and display device to facilitate readout of a random sample from the set of digits through which the variable-modulus counter is cycling upon the actuation of a pushbutton-controlled sampling circuit.

For a better understanding of the present invention, together with other a further objects thereof, reference is made to the following description taken in connection with the accompanying drawings in which preferred embodiments of the invention are illustrated, the scope of the invention being pointed out and contained in the appended claims.

DESCRIPTION OF THE PREFERRED EMBODIMENTS

Figure 2:
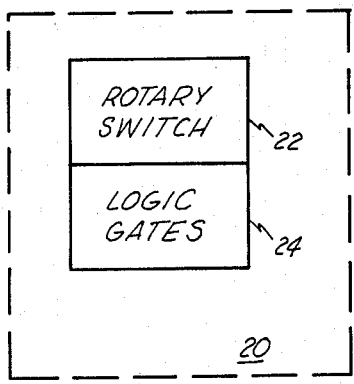
FIG. 2 shows in block diagram form the composition of the modulus selector of FIG. 1.
Figure 3:
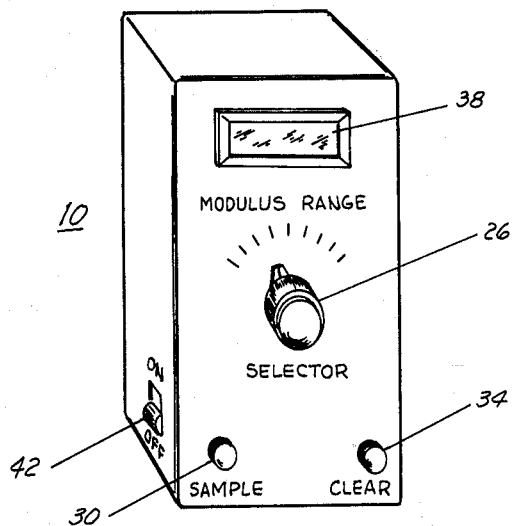
FIG. 3 shows a perspective view of a physical embodiment of the apparatus for generating random digits.

The electronic circuitry of the apparatus 10 is comprised of a frequency source 12 that produces a clock signal controlling and synchronizing operation of a variable-modulus counter 14, a synchronizer 16 and a counter 18. A modulus selector 20 consists of a rotary switch 22 and logic gates 24 as depicted in FIG. 2. Knob 26 of switch 22 is shown in FIG. 3. Selector 20 controls the modulus of the variable-modulus counter 14.

Figure 1:
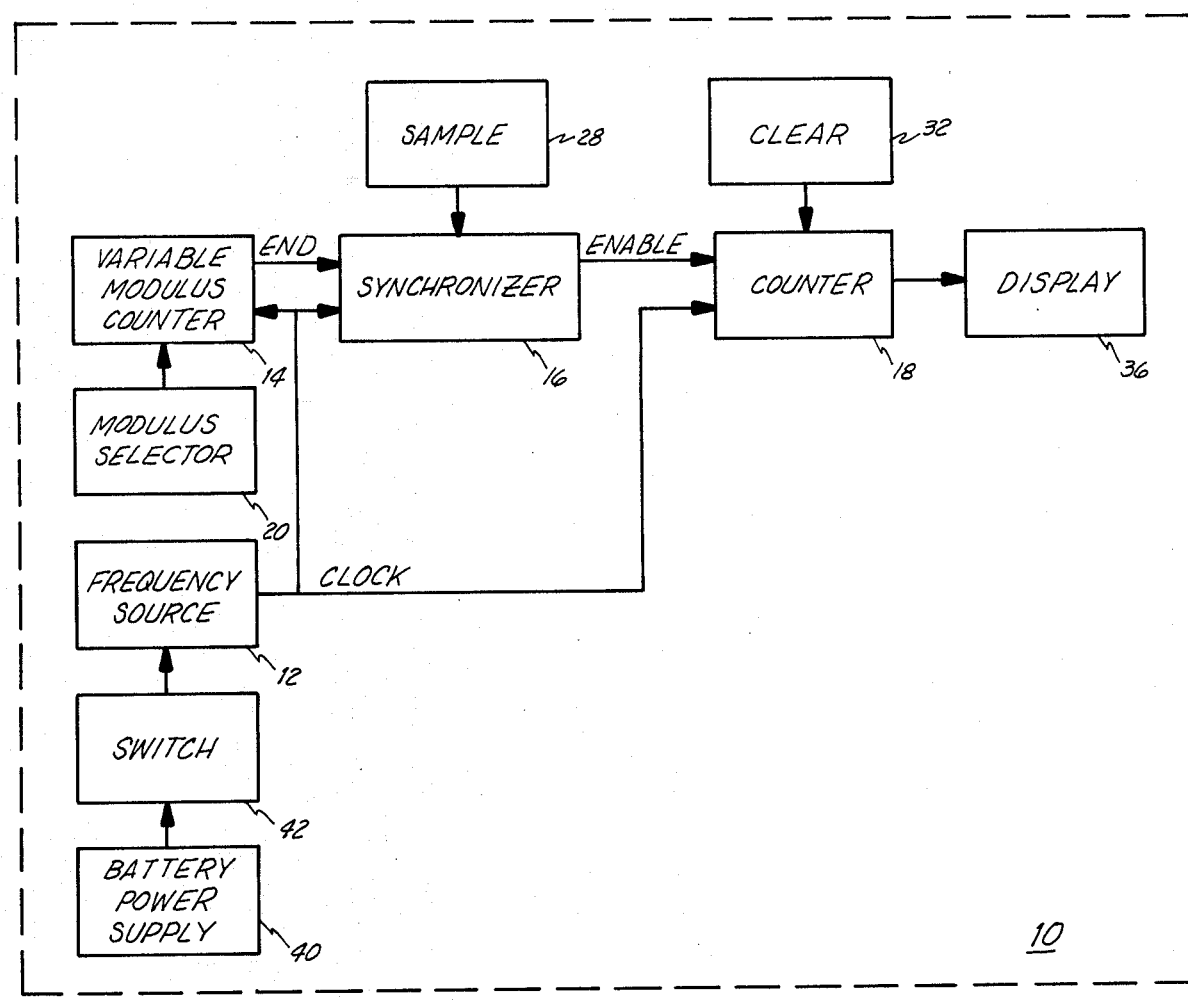
FIG. 1 depicts in diagram form the circuit of one embodiment of this invention in terms of functional blocks.

A sample circuit 28, having a pushbutton 30 as shown in FIG. 3, causes the synchronizer 16, FIG. 1, to enable counter 18 to count a number of clock pulses determined by the counts through which the variable-modulus counter 14 must cycle before reaching a defined end state. The clear circuit 32 resets to zero counter 18. A display means, which in this instance is display 36 reads out the number contained within counter 18.

Frequency source 12 operates to produce a pulse train or clock of sufficiently high frequency that the time required for the variable-modulus counter 14 to count through its maximum cycle is less than typical human response times. In the preferred embodiment the frequency source 12 operates at a frequency of approximately 500 kHz and the maximum modulus of the variable-modulus counter 14 is 100, producing a cycle time of 0.2 ms, which is far faster than the time in which human fingers are capable of responding to a stimulus. When sample pushbutton 30 acts through synchronizer 16 to enable counter 18, the state of variable modulus counter 14 cannot be predicted by the operator and thus is a random number. In the preferred embodiment the frequency source 12 is a free-running multivibrator circuit device of a type commercially available from various manufacturers of integrated circuits.

Selector 20 is made up of a rotary switch 22 and logic gates 24 that generate the signals required to cause variable-modulus counter 14 to count clock pulses with the selected modulus. In addition the selector 20 in the preferred embodiment includes an OFF position which stops the frequency source 12 from operating, thus decreasing the power consumption of the circuit to virtually zero because the CMOS integrated circuits from which the circuit is made draw minimal power except when operating in response to clock signals. This feature is not an essential part of this invention, but is useful to simplify switch design.

The variable-modulus counter 14 produces one END pulse for each "n" input clock pulses, where the variable n is controlled by signals from selector 20. In the preferred embodiment the variable-modulus counter 14 is an integrated circuit that includes two 4-bit binary-coded-decimal counting circuits connected to decrement once for each positive-going transistion of the clock signal. When these counting circuits reach a count of zero, an "END" pulse is generated and the counting circuits are set to a value determined by the lines from the selector 20 on the next clock rather than skipping to 99, as would be the case for un-modified down counting. Thus to obtain a modulus of 3, the select input lines would correspond to a count of 2 and the counter 18 would contain in succession the values 0, 2, 1, 0, 2, and so on.

Synchronizer 16 operates in response to a pushbutton-operated, sample circuit 28, the clock signal, and the END pulse from the variable-modulus counter 14 to produce an enable signal that becomes a logic 1 in synchronism with the first clock signal that occurs following actuation of pushbutton 30 of sample circuit 28, and removes this enable signal at the end of the next following END signal from the variable-modulus counter 14. The enable signal allows counter 18 to count a number of pulses ranging from 1 to the modulus selected by selector 20. For example if the modulus were set to 7, and pushbutton 30 were activated at the time that the variable modulus counter 14 held the value zero and thus the END signal was present, a total of 7 pulses would enter the counter 18 and be counted; if the pushbutton 30 were actuated while the variable-modulus counter 14 contained a 1, only one pulse would enter counter 18 and be counted.

A clearing means which in this instance is a clearing circuit 32 actuated by pushbutton 34 causes the counter 18 to be cleared to a count of zero. This pushbutton 34 is actuated before the sample pushbutton 30 in the case where a uniform distribution of random digits between 1 and the selected modulus is needed. If the button 34 is not actuated each time sample pushbutton 30 is actuated, then the resulting distribution is not uniformly distributed, and tends toward a value of one-half the modulus multiplied by the number of samples.

The display 36 may be any convenient means for displaying the number in the counter 18. In the preferred physical embodiment, FIG. 3, a liquid crystal display 38 is used to minimize power consumption. Any of a multiplicity of displays could be used as well without changing the scope of this invention.

Operating power for this apparatus is supplied by a battery power supply 40. The apparatus may be controlled by "on/off" switch 42.

What we claim as new is:

1. In an apparatus for the generation of random digits for use in statistical analysis and entertainment activities, improved digital electronic circuitry comprising:
    (a) a frequency source for producing a clock signal;
    (b) a counter of modulus n operably associated with the frequency source and adapted to cycle through a sequence that repeats after n cycles of the frequency source;
    (c) a second counter operably associated with the frequency source and the counter of modulus n, the second counter counting the number of clock pulses determined by the counts through which the counter of modulus n must cycle before reaching a defined end state;
    (d) a synchronizer operably associated with the frequency source, the counter of modulus n and the second counter, the synchronizer being adapted to enable the second counter during one cycle more than the number of cycles of the frequency source that occur between activation of the synchronizer and a defined state of the counter of modulus n, whereby the second counter is enabled to count frequency source cycles for a number between 1 and n, inclusive, depending on the time of activation of the synchronizer relative to the occurence of the defined state of the counter; and
    (e) a sample circuit operably associated with the synchronizer, the sample circuit arranged to activate the synchronizer at an undetermined or random state of the counter of modulus n whereby the number of cycles of the frequency source counted by the second counter represents a random sample of the digits 1 to n.

2. The improved digital electronic circuitry of claim 1, above, further comprising a modulus selector operably associated with the counter of modulus n for selecting the modulus n of said counter.

3. The improved digital electronic circuitry of claim 2, above, wherein the modulus selector is adapted to control the number of states of the counter of modulus n to permit a random digit to be selected from a set of n digits.

4. The improved digital electronic circuitry of claim 2, above, wherein the modulus selector comprises a rotary switch and a plurality of logic gates.

5. The improved digital electronic circuitry of claim 1, above, wherein the sample circuit is manually activated by a pushbutton control.

6. The improved digital electronic circuitry of claim 1, above, further comprising clearing means operably associated with the second counter for resetting the count in the second counter to zero before operation of the sample circuit.

7. The improved digital electronic circuitry of claim 1, above, further comprising a display means operably associated with the second counter for displaying the number of counts contained in said second counter upon activation of the sample circuit.

8. The improved electronic circuitry of claim 1, above, wherein the frequency source may be disabled to turn off the circuitry.

9. The improved electronic circuitry of claim 1, above, further comprising a battery power supply operably associated with the frequency source for providing a source of electrical power to said circuitry.

10. In an apparatus for the generation of random digits for use in statistical analysis and entertainment activities, improved digital electronic circuitry comprising:

(a) a frequency source for producing a clock signal;
(b) a counter of modulus n operably associated with the frequency source and adapted to cycle through a sequence that repeats after n cycles of the frequency source;
(c) a rotary switch-operated modulus selector operably associated with the counter of modulus n for selecting the modulus n of said counter;
(d) a second counter operably associated with the frequency source and the counter of modulus n, the second counter counting the number of clock pulses determined by the counts through which the counter of modulus n must cycle before reaching a defined end state;
(e) a synchronizer operably associated with the frequency source, the counter of modulus n and the second counter, the synchronizer being adapted to enable the second counter during the number of cycles of the frequency source between 1 and the modulus of the counter of modulus n;
(f) a sample circuit operably associated with the synchronizer, the sample circuit arranged to produce a random sample from the set of digits through which the counter of modulus n is cycling upon the actuation of said sample circuit;
(g) display means operably associated with the second counter for displaying the number of counts contained in said second counter upon activation of the sample circuit; and
(h) a battery power supply operably associated with the frequency source for providing a source of electrical power to said circuitry.

* * * * *